United States Patent
Rieger et al.

(10) Patent No.: US 10,725,155 B2
(45) Date of Patent: Jul. 28, 2020

(54) METHOD FOR MEASURING A DISTANCE

(71) Applicant: RIEGL Laser Measurement Systems GmbH, Horn (AT)

(72) Inventors: Peter Rieger, Grossau (AT); Andreas Ullrich, Gablitz (AT)

(73) Assignee: RIEGL LASER MEASUREMENT SYSTEMS GMBH, Horn (AT)

(*) Notice: Subject to any disclaimer, the term of this patent is extended or adjusted under 35 U.S.C. 154(b) by 282 days.

(21) Appl. No.: 15/579,288

(22) PCT Filed: Jun. 14, 2016

(86) PCT No.: PCT/AT2016/050196
§ 371 (c)(1),
(2) Date: Dec. 4, 2017

(87) PCT Pub. No.: WO2016/201469
PCT Pub. Date: Dec. 22, 2016

(65) Prior Publication Data
US 2018/0224528 A1    Aug. 9, 2018

(30) Foreign Application Priority Data

Jun. 15, 2015  (AT) .................. 50491/2015

(51) Int. Cl.
*G01S 7/484*    (2006.01)
*G01S 17/06*    (2006.01)
(Continued)

(52) U.S. Cl.
CPC .............. *G01S 7/484* (2013.01); *G01S 7/497* (2013.01); *G01S 13/20* (2013.01); *G01S 13/227* (2013.01);
(Continued)

(58) Field of Classification Search
CPC .......... G01S 17/10; G01S 17/42; G01S 13/20; G01S 17/06; G01S 7/484; G01S 7/497; G01S 13/227
(Continued)

(56) References Cited

U.S. PATENT DOCUMENTS

| 4,143,373 A | 3/1979 | Chernick |
| 2012/0257186 A1 | 10/2012 | Rieger et al. |

FOREIGN PATENT DOCUMENTS

| DE | 102008025244 A1 | 12/2009 |
| EP | 1962107 A2 | 8/2008 |

(Continued)

OTHER PUBLICATIONS

Austrian Office Action for A 50491/2015 dated Dec. 12, 2015.
(Continued)

*Primary Examiner* — Daniel L Murphy
(74) *Attorney, Agent, or Firm* — Hoffmann and Baron, LLP

(57) ABSTRACT

The present invention relates to a method for measuring the distance of targets in the surroundings by way of a time-of-flight measurement of pulses, in particular laser pulses, reflected at said targets, said pulses each being successively emitted at a transmission time in accordance with a predeterminable pulse repetition rate and said pulses, after the reflection thereof, each being received at a reception time, said method comprising the following steps:
  selecting a first pulse repetition rate from a set of at least two different pulse repetition rates and predetermining the selected pulse repetition rate for the emission,
  ascertaining a transmission time lying closest in time to the reception time of a reflected pulse and a time interval between these, and,
  if the ascertained time interval drops below a predetermined first threshold, selecting a second pulse repetition rate from the set and predetermining the second pulse repetition rate for the emission.

8 Claims, 4 Drawing Sheets

(51) Int. Cl.
    *G01S 7/497*        (2006.01)
    *G01S 17/10*        (2020.01)
    *G01S 13/20*        (2006.01)
    *G01S 17/42*        (2006.01)
    *G01S 13/22*        (2006.01)

(52) U.S. Cl.
    CPC .............. *G01S 17/06* (2013.01); *G01S 17/10* (2013.01); *G01S 17/42* (2013.01)

(58) Field of Classification Search
    USPC ........................................................ 356/5.01
    See application file for complete search history.

(56) References Cited

FOREIGN PATENT DOCUMENTS

| | | |
|---|---|---|
| GB | 1298709 | 6/1972 |
| WO | WO2016138585 A1 | 9/2016 |

OTHER PUBLICATIONS

IPRP for PCT/AT2016/050196 dated May 15, 2017.
English translation of International Preliminary Report on Patentability for PCT/AT2016/050196.
European Office Action dated Jan. 4, 2019 in corresponding European Patent Application No. 16 735 981.9 with machine translation, pp. 1-7.

(State of the Prior Art)

METHOD FOR MEASURING A DISTANCE

CROSS-REFERENCE TO RELATED APPLICATIONS

This application is a National Phase application of International Application No. PCT/AT2016/050196 filed Jun. 14, 2016 which claims priority to Austrian Patent Application No. A 50491/2015 filed Jun. 15, 2015, the disclosures of which are incorporated herein by reference.

BACKGROUND

The present invention relates to a method for measuring the distance of targets in the surroundings by way of a time-of-flight measurement of pulses reflected at said targets. The pulses can be of any type, for example light pulses, in particular laser pulses, radio pulses, in particular radar pulses, sound pulses, or the like.

Modern pulse time-of-flight distance meters, such as laser distance meters or scanners, work with high pulse power over large distances and/or high pulse repetition rates in order to quickly create a number of distance measurement points in the surroundings, wherein they attain a high time and/or spatial resolution. In both cases the situation can arise that the next pulse is already emitted before the reflection of the last pulse has been received, so that the incoming received pulses can no longer be clearly assigned to their corresponding transmitted pulse. This is known as a "multiple time around" (MTA) or "multiple pulses in the air" problem. The maximum size $d_{max}$ of the distance range that can be clearly measured, or what is known as the MTA zone, is given here from the pulse repetition rate (PRR) and the light speed c to give $d_{max}=c/(2 \cdot PRR)$.

If a laser scanner for example offers a pulse repetition rate of 400 kHz, this corresponds to an MTA zone size $d_{max}$ von of approximately 375 m.

A wide range of methods is known for correct mutual assignment of the transmitted and received pulses for clear distance measurement results. A first possibility lies in ensuring during the planning of the measurement task that all anticipated targets in the surroundings lie within the same MTA zone so as to be able to perform the correct assignment. This method is naturally applicable only for specific measurement tasks, and for example is unsuitable for highly mobile or long-range measurement or scanning tasks, for example the air-borne scanning of topographies or the ground-borne measurement of mountain ranges or moving vehicles.

Another group of methods is based on the principle of making the individual transmitted pulses distinguishable from one another by varying and/or coding their polarisation, amplitude or wavelength, so as to be able to assign the received pulses accordingly. These methods, however, are either suitable only for few "pulses in the air" or require complex coded pulses, which limits the pulse repetition rate and the measurable distance range and extends the measurement time.

An alternative method which uses pulse position modulation is known from patent EP 2 694 996 B1 in the name of the same applicant. Here, a sequence of pulses modulated in respect of their mutual pulse intervals is emitted, and the correct MTA zone is determined by searching for the least noisy received pulse sequence.

All of these methods, however, have the common feature that the receipt of a reflected (earlier) pulse at the time of emission of a (later) pulse is not possible due to design, more specifically because the receiving electronics is saturated or overloaded by near reflections or the back-scattering of an emitted pulse at components of the distance meter, for example housing or assembly parts or an exit window thereof, and is thus "blind" to the receipt of a reflected pulse. A reception gap or what is known as a "blind range" thus remains in the distance measurement at each boundary between two MTA zones. Reflections at targets in the surroundings at such a distance cannot be received at all—or in the case of pulse position modulation can only be received in individual cases and therefore only with very low time and/or spatial resolution.

SUMMARY

The object of the invention is to create a method for measuring a distance or scanning targets in the surroundings, by means of which method the effects of blind ranges at MTA zone boundaries are reduced or eliminated in the first place.

This object is achieved with a method for measuring the distance of targets in the surroundings by way of a time-of-flight measurement of pulses, in particular laser pulses, reflected at said targets, said pulses each being successively emitted at a transmission time in accordance with a predeterminable pulse repetition rate and said pulses, after the reflection thereof, each being received at a reception time, said method comprising the following steps: selecting a first pulse repetition rate from a set of at least two different pulse repetition rates and predetermining the selected pulse repetition rate for the emission, ascertaining a transmission time lying closest in time to the reception time of a reflected pulse and a time interval between these, and, if the ascertained time interval drops below a predetermined first threshold, selecting a second pulse repetition rate from the set and predetermining the second pulse repetition rate for the emission.

The method is based on the finding that, even when scanning over a large area, for example air-borne scanning of a topography, in particular with the very high pulse repetition rates attainable nowadays and the resultant very high measurement point density and thus spatial resolution, and even more so when measuring the distance of moving targets in the surroundings, large differences in the pulse times-of-flight of successively received pulses are very rare. The reception times of the successively received pulses reflected at the targets in the surroundings therefore generally draw closer to the transmission times slowly and approximately uniformly, with the same pulse repetition rate of successively transmitted pulses, i.e. a topography usually draws closer to a blind range gradually in practice. According to the present method, if the reception time of a reflected pulse comes too close to the transmission time of a transmitted pulse, i.e. the topography draws closer to a blind range, the following transmission time will be shifted by predetermining another pulse repetition rate and thus another pulse interval, whereby the distances of the blind ranges from the laser scanner or distance meter are offset proportionally. By means of this selective shift or offset of the blind ranges—with suitable determination of the aforesaid first threshold—the occurrence of a reflection at a transmission time and therefore a reception gap can be very effectively prevented in the majority of cases.

The present method additionally can be combined with all methods known in the prior art for correct mutual assignment of the transmitted and received pulses, i.e. for identifying the MTA zone; with use of methods with pulse position modulation, the aforesaid pulse repetition rates from the aforesaid set correspond in each case to a mean pulse repetition rate of the pulse position modulation.

In accordance with a preferred embodiment of the invention the reciprocal value of the greatest pulse repetition rate and the reciprocal value of the smallest pulse repetition rate from the aforesaid set differ from one another by at least twice the first threshold. In this way, in the practical situation that the pulse times-of-flight of successive pulses do not change suddenly, but instead only gradually, a coincidence of transmission and reception times or of the distance of a target in the surroundings and blind range is avoided particularly reliably, since the difference in the pulse repetition rates is so great that subsequent transmission times are shifted to a sufficient extent.

Depending on whether a reception time lies close to the last or next transmission time or whether a target in the surroundings is in front of or behind a near blind range from the viewpoint of the laser scanner, the predetermination of another pulse repetition rate thus acts either as a "falling back" of the blind range relative to the target in the surroundings or as a "leapfrogging" of the target in the surroundings; the next transmission time is therefore either further distanced from the subsequent reception time ("falling back") or the chronological sequence thereof is swapped ("leapfrog").

In order to achieve a selective leapfrogging or falling back, in a particularly preferred embodiment of the method, if the transmission time ascertained in the event that the first threshold is undershot lies before the aforesaid reception time, the next-greatest pulse repetition rate or, if there is no such pulse repetition rate, the smallest pulse repetition rate is selected from the set as second pulse repetition rate, and, if the transmission time ascertained in the event that the first threshold is undershot lies after the aforesaid reception time, the next-smallest pulse repetition rate or, if there is no such pulse repetition rate, the greatest pulse repetition rate is selected from the set as second pulse repetition rate. By means of a shift of this type of the transmission times and offset of the blind ranges, the effect thereof can be selectively eliminated.

Should the ascertained time interval exceed a predetermined second threshold, which is greater than the first threshold, it is also particularly favourable if the next-greatest or greatest pulse repetition rate is selected from the set as second pulse repetition rate. In this way, the method for measuring a distance returns more quickly to the greatest possible pulse repetition rate following a falling back or leapfrogging of the blind ranges, thus resulting more quickly in a greater or the greatest possible time and/or spatial resolution.

BRIEF DESCRIPTION OF THE DRAWINGS

The invention will be explained hereinafter in greater detail on the basis of exemplary embodiments depicted in the accompanying drawings, in which.

DETAILED DESCRIPTION

Figure 1:
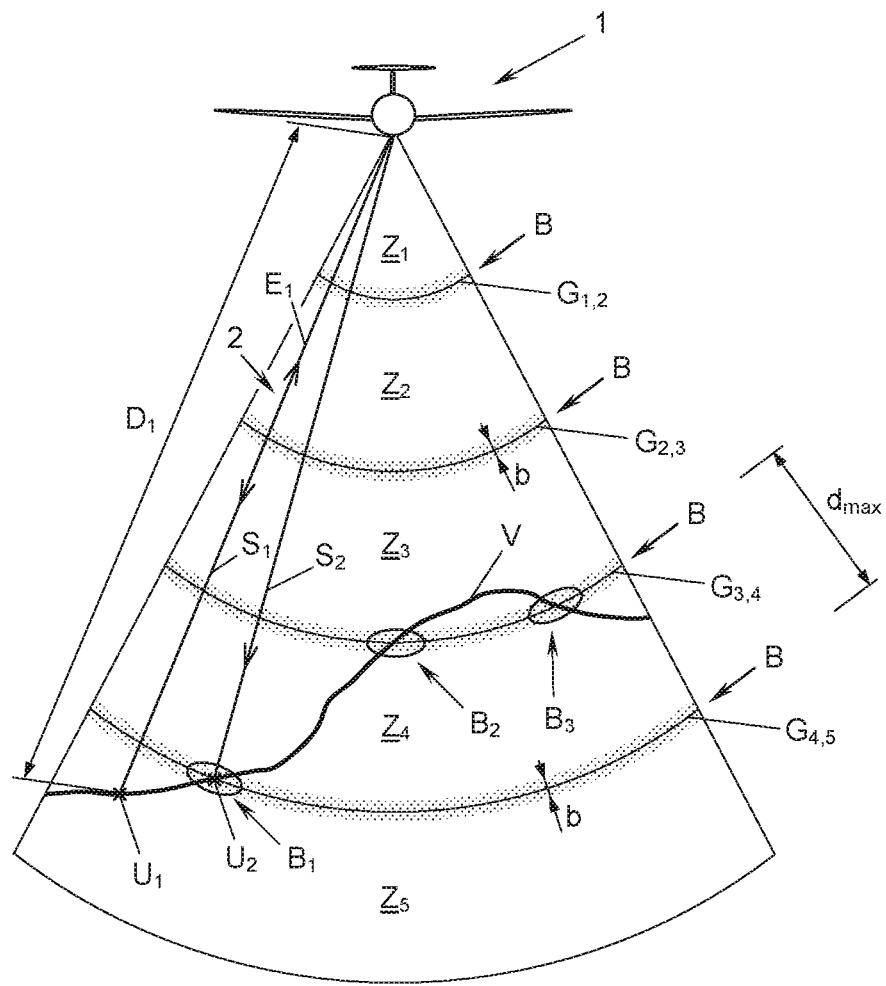
FIG. 1 shows a schematic example of the pulse time-of-flight distance measurement of a topography by means of an air-borne laser scanner according to the prior art.

According to the example of FIG. 1, a pulsed laser measurement beam 2 is guided in a sweeping manner from an airborne laser scanner 1, for example in rows in a fan-shaped manner over a topography V, for example a mountain, with individual targets in the surroundings (scanning points) $U_1, U_2, \ldots$, generally U. The target distances $D_1, D_2, \ldots$, generally D, from the individual targets U in the surroundings are determined from time-of-flight measurements at the individual emitted pulses $S_1, S_2, \ldots$, generally S, which are retrieved after the reflection at the surroundings as received pulses $E_1, E_2, \ldots$, generally E.

The laser scanner 1 works with a very high pulse repetition rate (PRR) and determines the target distances D of a number of targets U in the surroundings in quick succession, whereby a high time and/or spatial resolution is made possible with short overall measurement time. If a target U, for example $U_1$, in the surroundings is distanced further from the laser scanner 1 than corresponds to the quotient of light speed c and twice the pulse repetition rate PRR, the next transmitted pulse S is thus already emitted before the reflection E of the last transmitted pulse S has been received. Here, the incoming received pulses E can no longer be clearly assigned to their corresponding transmitted pulse S. This is known as a "multiple time around" (MTA) or "multiple pulses in the air" problem. In the example of FIG. 1 five clearly measurable distance ranges, also referred to as "MTA zones", $Z_1, Z_2, \ldots, Z_5$, generally Z, are formed in this way, the width thereof being, in each case, $d_{max} = c/(2 \cdot PRR)$.

Zone boundaries $G_{1,2}, G_{2,3}, \ldots$, generally G, between two MTA zones Z thus represent the distance from the laser scanner 1 from which there is a further "pulse in the air" when this distance is exceeded. If a target $U_2$ in the surroundings lies at a boundary zone G (here: the boundary zone $G_{4,5}$), the reflected pulse E arrives at the laser scanner 1 exactly at the time of emission of a subsequent transmission pulse S and cannot be received in the receiving electronics of the distance meter or scanner 1 for the reasons indicated in the introduction (device near reflections or back-scattering of the transmitted pulses S). Targets U in the surroundings at the zone boundaries G are thus invisible to the laser scanner 1, and therefore a blind range B forms around each zone boundary G, the width b of which blind range is dependent, among other things, on the width or duration of the transmitted pulse S and the distance of interfering short-range targets in the laser scanner 1, for example housing parts or passage windows.

For the topography V in the example of FIG. 1, three specific regions $B_1, B_2$ and $B_3$ are provided at the zone boundaries $G_{4,5}$ and $G_{3,4}$, in which no targets U in the surroundings can be detected.

On the basis of different examples depicted in FIGS. 2 to 4, a method for pulse time-of-flight distance measurement will be described hereinafter which reduces or avoids the effect of blind ranges B.

Figure 2:
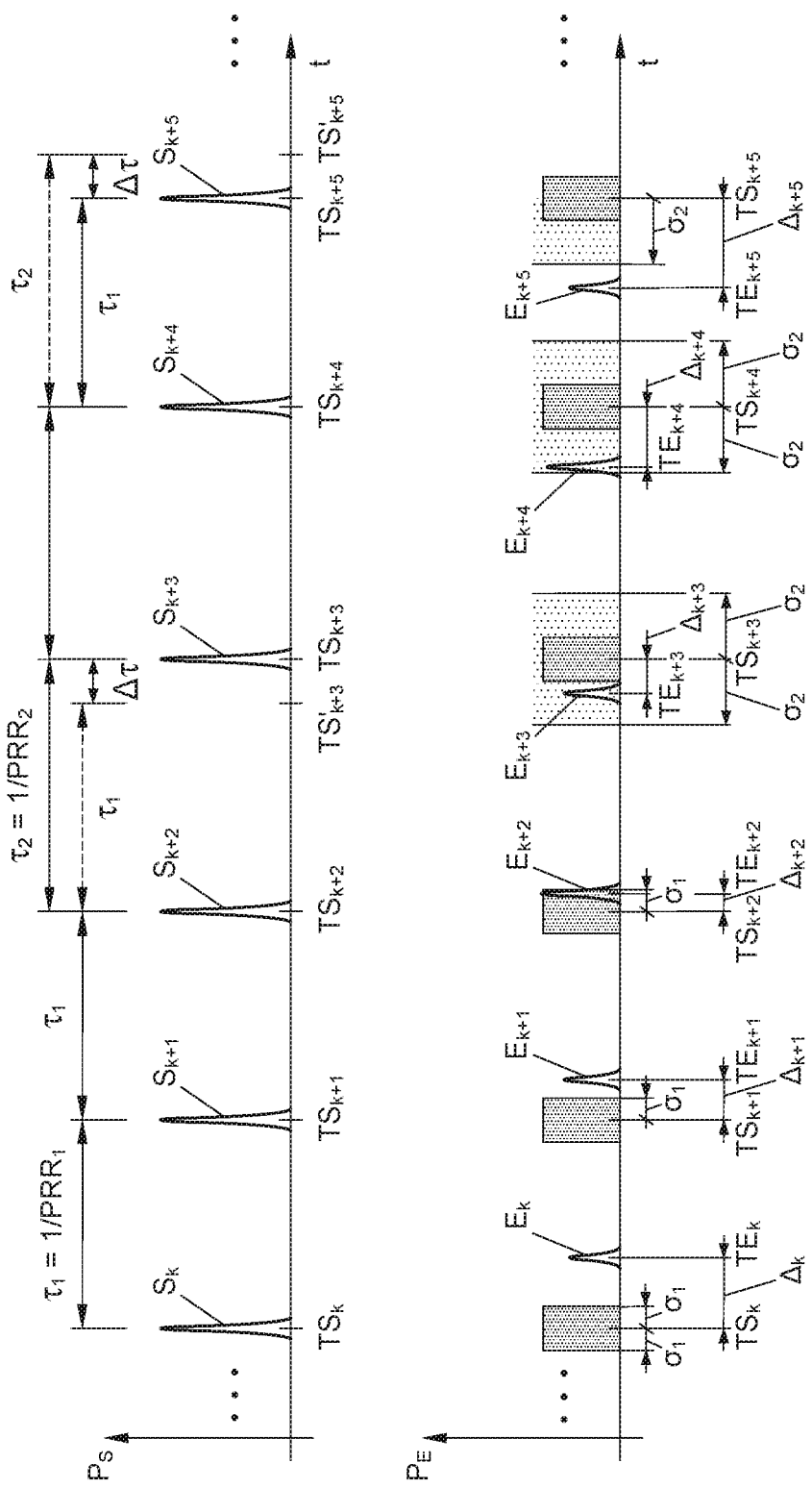
FIG. 2 shows exemplary time graphs of transmitted and received pulses for different steps and variants of the method of the invention.
Figure 3:
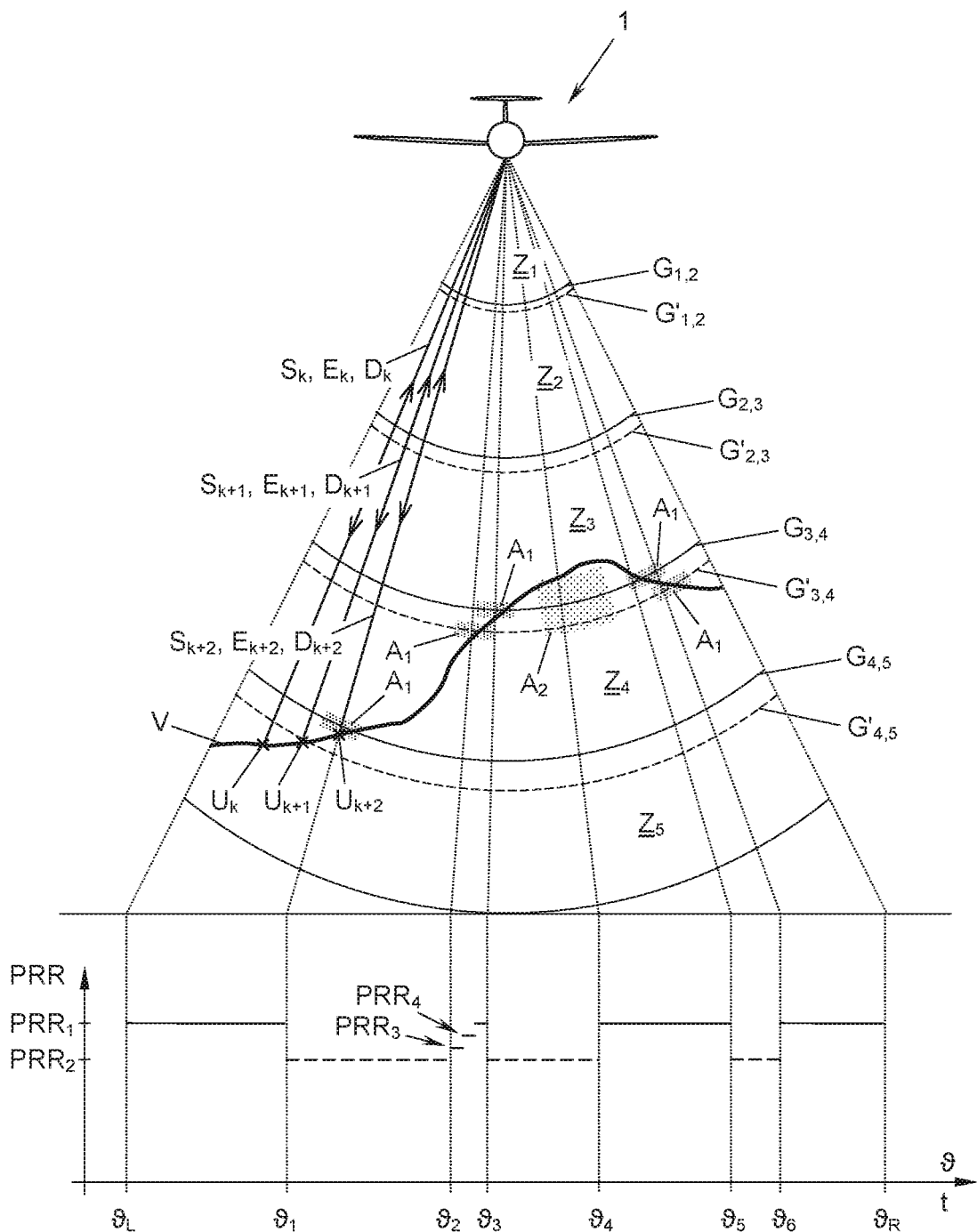
FIG. 3 shows exemplary variants of an application of the method according to the invention of FIG. 2 to the situation of FIG. 1 with an associated graph of pulse repetition rates over the scanning angle or time.

According to FIGS. 2 and 3, three exemplary transmitted pulses $S_k, S_{k+1}, S_{k+2}$ (depicted in the graph of FIG. 2 as transmitted pulse power $P_S$ over time t) with a predetermined first mutual pulse spacing $\tau_1$, which is the reciprocal value $1/PRR_1$ of a first pulse repetition rate $PRP_1$, are emitted successively at transmission times $TS_k, TS_{k+1}, TS_{k+2}$ respectively. The first pulse repetition rate $PRR_1$ is selected here from a set $M=\{PRR_i\}$ (i=1, 2, . . . , I; I≥2) of at least two different pulse repetition rates $PRR_i$, as will be explained later in greater detail. In addition, received pulses $E_k$, $E_{k+1}$, . . . (depicted in the graph of FIG. 2 as received pulse power $P_E$ over time t) are received by the laser scanner 1 at the reception times $TE_k$, $TE_{k+1}$ . . . .

To explain the present method more simply, the same index k is used in the example of FIGS. 2 and 3 for each received pulse E assigned to a corresponding transmitted pulse S, and the temporal illustration one above the other of the transmitted and received pulse trains $P_s(t)$ and $P_E(t)$ selected in FIG. 2 is indicative of targets U in the surroundings in the first MTA zone $Z_1$; for targets U in other MTA zones, for example here the targets $U_k$, $U_{k+1}$, $U_{k+2}$ in the fourth and fifth MTA zone $Z_4$, $Z_5$, a corresponding time offset between the two pulse trains $P_S(t)$ and $P_E(t)$ must be taken into consideration in FIG. 2. The corresponding MTA-zone-correct assignment of the transmitted and received pulses S, E of the two pulse trains $P_S(t)$ and $P_E(t)$ can be performed independently of the present method in any way known in the prior art and is not described here in greater detail.

It goes without saying that the mutual spacing of the received pulses E is dependent not only on the pulse spacing (here: $\tau_1$) of the associated transmitted pulses S, but also on the distance of the targets U in the surroundings reflecting said pulses. In the example of FIG. 2, the reception times $TE_k$, $TE_{k+1}$, and $TE_{k+2}$ therefore move ever closer to the respective closest transmission times $TS_k$, $TS_{k+1}$ and $TS_{k+2}$, if, as in the example of FIG. 3, with sweeping fan-shaped scanning in rows in an angular range between the scan boundary angles $\vartheta_L$ and $\vartheta_R$ from left to right, the target distances $D_k$, $D_{k+1}$, $D_{k+2}$ of three scanned targets $U_k$, $U_{k+l}$, $U_{k+2}$ in the surroundings become shorter, running from the laser scanner 1.

According to FIG. 2, upon receipt of a reflected received pulse $E_k$, the transmission time TS closest to the reception time $TE_k$ of said pulse (here: transmission time $TS_k$) and a time interval $\Delta_k$ between these two are ascertained. It is then checked whether the ascertained time interval $\Delta_k$ falls below a predetermined first threshold $\sigma_1$, i.e. whether the reception time $TE_k$ lies within a window extending with the "width" of the first threshold $\sigma_1$ in each case from left to right from the closest ascertained transmission time $TS_k$. In the example of FIG. 2 this is not the case for the received pulses $E_k$, $E_{k+1}$; by contrast, the time interval $\Delta_{k+2}$ determined for the reception time $TE_{k+2}$ of the third received pulse $E_{k+2}$ for the transmission time $TS_{k+2}$ lying closest in time is smaller than the aforesaid first threshold $\sigma_1$. If desired, a time interval of this type $\Delta_k$, $\Delta_{k+1}$, . . . can also be determined only for each second received pulse E, or less often, for example depending on a previously determined time interval $\Delta_{k-1}$, $\Delta_{k-2}$, . . . .

In the case that the first threshold $\sigma_1$ is undershot, a second pulse repetition rate $PRR_2$ is selected from the aforesaid set $M=\{PRR_i\}$ and predetermined for the following transmission of transmitted pulses S, here: $S_{k+3}$, $S_{k+4}$. The transmitted pulses $S_{k+2}$, $S_{k+3}$ and $S_{k+4}$ consequently have a mutual pulse spacing $\tau_2$, which corresponds to the reciprocal value $1/PRR_2$ of the second pulse repetition rate $PRR_2$ and differs by an amount $\Delta\tau$ from the first pulse spacing $\tau_1$; see the hypothetical transmission time $TS'_{k+3}$ in FIG. 2 with pulse spacing $\tau_1$ from the transmission time $TS_{k+2}$. The zone boundaries G are thus shifted from the positions shown by solid lines to the positions shown by dashed lines, for example the boundary $G_{4,5}$ to the boundary $G'_{4,5}$.

Figure 4A:
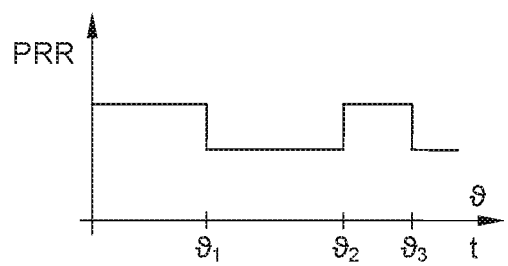
FIGS. 4a to 4h show different variants of the method of FIGS. 2 and 3 in graphs of pulse repetition rates over the scanning angle or time.
Figure 4B:
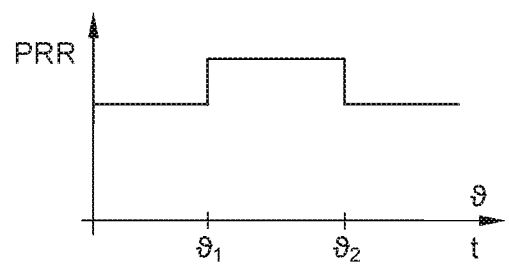

FIG. 3 shows a selection of this kind of the second pulse repetition rate $PRR_2$ from the set M with a scanning angle $\vartheta_1$ in a graph of the pulse repetition rates PRR over the scanning angle $\vartheta$ or time t as jump from the first pulse repetition rate $PRR_1$ to the (smaller) second pulse repetition rate $PRR_2$; this can also be deduced from the schematic graph of FIG. 4a. The situation possible as an alternative to this example, i.e. that the first pulse repetition rate $PRR_1$ is smaller than the second $PRR_2$, is depicted in FIG. 4b.

The temporal drawing closer of the reception time $TE_{k+2}$ to the transmission time $TS_{k+2}$ (FIG. 2) can also be seen in FIG. 3, in that the topography V at the scanning angle $\vartheta_1$ arrives so to speak in a spatial portion $A_1$ around the zone boundary $G_{4,5}$ corresponding to the first threshold $\sigma_1$, this being symbolised by grey shading. By corresponding determination of the first threshold $\sigma_1$, the portion $A_1$ for example has approximately the same width b (FIG. 1) as the blind ranges B; it can be, alternatively, wider or (less preferred) even narrower.

Revisiting the example of FIG. 2, the closest transmission time $TS_{k+3}$ after the aforesaid pulse repetition rate change from $PRR_1$ to $PRR_2$ is now distanced sufficiently far from the closest reception time $TE_{k+3}$, in this example thereafter; the received pulse $E_{k+3}$ was "leapfrogged" so to speak. FIG. 3 shows this leapfrogging as an offset of the zone boundary from $G_{4,5}$ (as a result of the first pulse repetition rate $PRR_1$) to $G'_{4,5}$ (as a result of the second pulse repetition rate $PRR_2$), whereby the blind range B at the scanning angle $\vartheta_1$ "leapfrogs" the topography V so to speak. To this end, the first threshold $\sigma_1$ could optionally also be determined depending on the particular considered MTA zone Z.

Alternatively to a leapfrogging of this kind, a "falling back" of the transmission times S in relation to the reception times E or of a zone boundary G in relation to the topography V can be provided by suitable selection of another pulse repetition rate $PRR_i$ from the set M, as symbolised for the scanning angle range $\vartheta_2$ to $\vartheta_3$ in the example of FIG. 4a for a set M of two different pulse repetition rates $PRR_i$, and in the example of FIG. 3 for a set M of four different pulse repetition rates $PRR_i$. In the latter example—proceeding from the smallest pulse repetition rate (here: $PRR_2$)—when the topography V draws closer to the laser scanner 1 and the zone boundary $G'_{3,4}$, the next-highest pulse repetition rate $PRR_3$ is firstly predetermined, and as it draws closer to the new resultant zone boundary, the even higher pulse repetition rate $PRR_4$ is predetermined, and so on and so forth, up to the highest pulse repetition rate (Here: $PRR_1$). As the topography draws even closer to the laser scanner, a falling back due to a lack of higher pulse repetition rates $PRR_i$ in the set M is not possible; instead, in this case with the scanning angle $\vartheta_3$ the smallest pulse repetition rate (here: $PRR_2$) is selected from the set M and the topography V is thus leapfrogged; see FIGS. 3 and 4a.

Figure 4C:
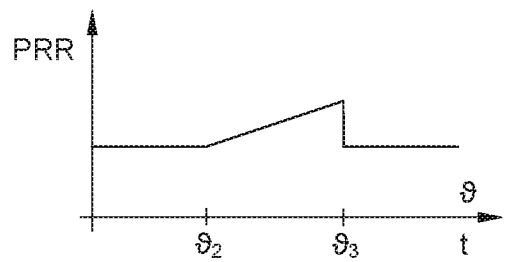
Figure 4D:
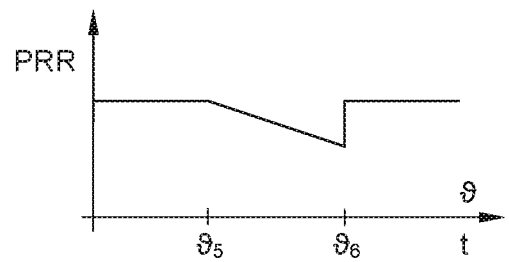

FIG. 4c shows the same situation for a set M with a number of pulse repetition rates $PRR_i$ as quasi-continuous, ramp-like profile. In FIG. 4d this situation is shown for the reverse example, wherein the topography V approaches a zone boundary G as it is further distanced from the laser scanner 1, so that the predetermination of increasingly smaller pulse repetition rates $PRR_i$ of the set M firstly results in a falling back, and upon reaching the smallest pulse repetition rate $PRR_i$ the predetermination of the greatest pulse repetition rate $PRR_i$ of the set M results in a leapfrogging, as is shown comparatively for a set $M=\{PRR_1, PRR_2\}$ of two pulse repetition rates $PRR_i$ for the scanning angles $\vartheta_5$ to $\vartheta_6$ in the example of FIG. 3.

As is clear on the basis of these examples, the reciprocal value (in the example of FIG. 2: the pulse spacing $\tau_1$) of the greatest pulse repetition rate (here: $PRR_1$) and the reciprocal value (here: the pulse spacing $\tau_2$ of the smallest pulse repetition rate (here: $PRR_2$) from the set M differ from one another by at least twice the first threshold $\sigma_1$; if it is possible to dispense with the receipt of individual reflected pulses, the difference of the specified reciprocal values could also be smaller.

In practice, it is favourable if the highest pulse repetition rate $PRR_i$ from the set M (in the present example: $PRR_1$) is predetermined as often as possible, since this entails the quickest pulse sequence and thus the highest possible measurement resolution. For this purpose, a topography V becoming further distanced from a zone boundary G is optionally "lagged" so to speak, as will be explained hereinafter on the basis of the scanning angle $\vartheta_4$ and for the reception pulse $E_{k+5}$ in the examples of FIGS. 2 and 3.

To this end, a second threshold $\vartheta_2$, which is greater than the first threshold $\sigma_1$, and thus a second location portion $A_2$ (FIG. 3) are determined. The time interval $\Delta_{k+5}$ of the reception time $TE_{k+5}$ from the closest transmission time $TS_{k+5}$ exceeds this second threshold $\sigma_2$—which was not yet the case for the time interval $\Delta_{k+4}$ from the reception time $TE_{k+4}$—and the topography V leaves the portion $A_2$ at the scanning angle $\vartheta_4$. Consequently, the next-greatest or equally the greatest pulse repetition rate (here: $PRR_1$) is selected from the set M. The time interval $\Delta_{k+5}$, as in the presented example, can be ascertained already proceeding from the transmission time $TS_{k+5}$ altered in accordance with the newly selected pulse repetition rate $PRR_1$— according to FIG. 3 the portion $A_2$ thus lies at the boundary zone $G_{3,4}$ of the newly selected pulse repetition rate $PRR_1$— or alternatively proceeding from the transmission time $TS'_{k+5}$, i.e. on the basis of the last-predetermined pulse repetition rate $PRR_2$.

Due to the interaction of the first and second threshold $\sigma_1$, $\sigma_2$, a hysteresis is produced so to speak: If the reception times TE move closer to the transmission times TS or the topography V moves closer to a blind range B, so that the first threshold $\sigma_1$ is undershot, there is thus a falling back or leapfrogging; see the scanning angles $\vartheta_1$, $\vartheta_2$ and $\vartheta_3$ in the example of FIG. 3; if neither the first threshold $\sigma_1$ is undershot nor the second threshold $\sigma_2$ is exceeded, no new pulse repetition rate $PRR_i$ is selected from the set M, this occurring only if the second threshold $\sigma_2$ is exceeded; if, consequently, the second threshold $\sigma_2$ is undershot again by the topography drawing closer to a blind range, the pulse repetition rate $PRR_1$ by contrast remains unchanged until the first threshold $\sigma_1$ is also undershot.

Figure 4E:
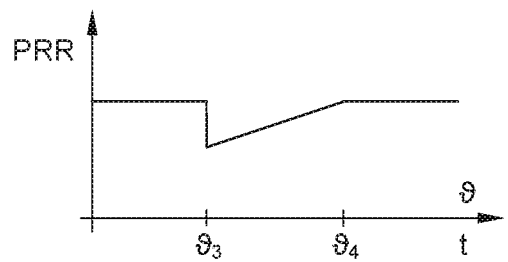
Figure 4F:
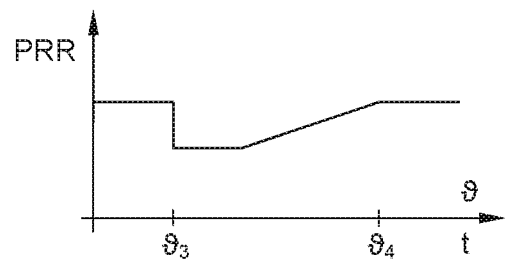
Figure 4G:
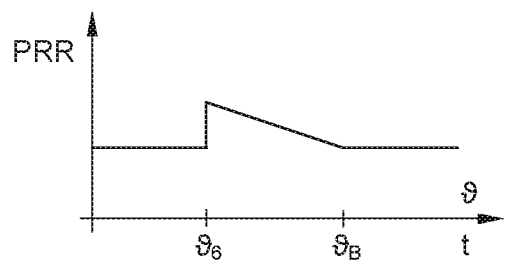
Figure 4H:
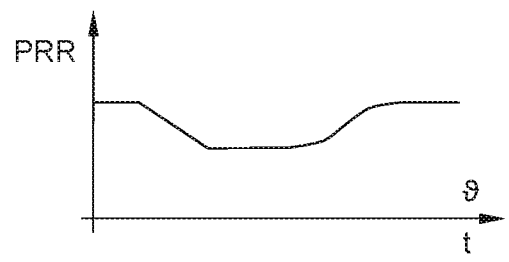

It goes without saying that the aforesaid disadvantages here—similarly to the above-described falling back—on the one hand can be sudden in the event of a set M of two pulse repetition rates $PRR_1$ (as in the case of the scanning angle $\vartheta_4$ in FIG. 3) or on the other hand, with a greater set M of pulse repetition rates $PRR_1$, can be multi-stepped or ramped (FIG. 4e) or, for example with a greater difference between the first and second threshold $\sigma_1$, $\sigma_2$ as in the example of FIG. 4f, can be ramped with a break, more specifically on the one hand with a topography V drawing closer to the laser scanner 1 according to FIGS. 4e and 4f and on the other hand with a topography V becoming further distanced from the laser scanner 1 according to the example of FIG. 4g. Furthermore, the falling back or lagging could also occur approximately in an S-shape (FIG. 4h). FIG. 4h additionally shows the particular case in which the topography V drawing closer to a boundary zone G is firstly avoided, but the topography V consequently becomes further distanced, so that lagging is possible without leapfrogging.

The invention is not limited to the presented embodiments, but comprises all variants, combinations and modifications that fall within the scope of the accompanying claims. The distance measurement could thus be performed for example on the basis of general light pulses, radio pulses, in particular radar pulses, sound pulses, or the like and/or from—stationary or movable—ground-, air- or sea-borne scanners or distance meters which for example are directed towards moving targets U in the surroundings.

What is claimed is:

1. A method for measuring the distance of a target by way of time-of-flight measurements on pulses reflected at said targets, said pulses being successively emitted in accordance with a predeterminable pulse repetition rate, each pulse being emitted at a transmission time and after reflection at said target, being received at a reception time, comprising:
    selecting a first pulse repetition rate from a set of at least two different pulse repetition rates and predetermining the selected first pulse repetition rate as pulse repetition rate for the emission of the pulse;
    for at least one of the reception times, ascertaining a transmission time lying closest in time to said reception time, and ascertaining a time interval between said reception time and the ascertained transmission time;
    and, if the ascertained time interval is below a first threshold, selecting a second pulse repetition rate from the set and predetermining the selected second pulse repetition rate as the pulse repetition rate for the emission of the pulses;
    wherein a reciprocal value of a greatest pulse repetition rate from the set and a reciprocal value of a smallest pulse repetition rate from the set differ from one another by at least twice the first threshold.

2. The method according to claim 1, wherein, if the ascertained transmission time lies before reception time, a next-greatest pulse repetition rate or, if there is no such pulse repetition rate, a smallest pulse repetition rate from the set is selected as said second pulse repetition rate,
    and, if the ascertained transmission time lies after said reception time, a next-smallest pulse repetition rate or, if there is no such pulse repetition rate, a largest pulse repetition rate from the set is selected as said second pulse repetition rate.

3. The method according to claim 2, wherein, if the ascertained time interval exceeds a second threshold which is greater than the first threshold, a next-greatest or greatest pulse repetition rate from the set is selected as said second pulse repetition rate.

4. The method according to claim 1, wherein, if the ascertained time interval exceeds a second threshold, which is greater than the first threshold, a next-greatest or greatest pulse repetition rate from the set is selected as said second pulse repetition rate.

5. The method according to claim 1, wherein the pulses are laser pulses.

6. A method for measuring the distance of a target by way of time-of-flight measurements on pulses reflected at said target, said pulses being successively emitted in accordance with a predeterminable pulse repetition rate, each pulse being emitted at a transmission time and after reflection at said target, being received at a reception time, comprising:
    selecting a first pulse repetition rate from a set of at least two different pulse repetition rates and predetermining the selected first pulse repetition rate as pulse repetition rate for the emission of the pulse;

for at least one of the reception times, ascertaining a transmission time lying closest in time to said reception time, and ascertaining a time interval between said reception time and the ascertained transmission time;

and, if the ascertained time interval is below a first threshold, selecting a second pulse repetition rate from the set and predetermining the selected second pulse repetition rate as the pulse repetition rate for the emission of the pulses;

wherein, if the ascertained time interval exceeds a second threshold, which is greater than the first threshold, a next-greatest or greatest pulse repetition rate from the set is selected as said second pulse repetition rate.

7. The method according to claim 6, wherein, if the ascertained transmission time lies before reception time, a next-greatest pulse repetition rate or, if there is no such pulse repetition rate, a smallest pulse repetition rate from the set is selected as said second pulse repetition rate, and, if the ascertained transmission time lies after said reception time, a next-smallest pulse repetition rate or, if there is no such pulse repetition rate, a largest pulse repetition rate from the set is selected as said second pulse repetition rate.

8. The method according to claim 6, wherein the pulses are laser pulses.

* * * * *